(No Model.)
H. C. & D. MILLEN.
PROCESS OF MANUFACTURING HYDRAULIC CEMENT.
No. 343,913. Patented June 15, 1886.
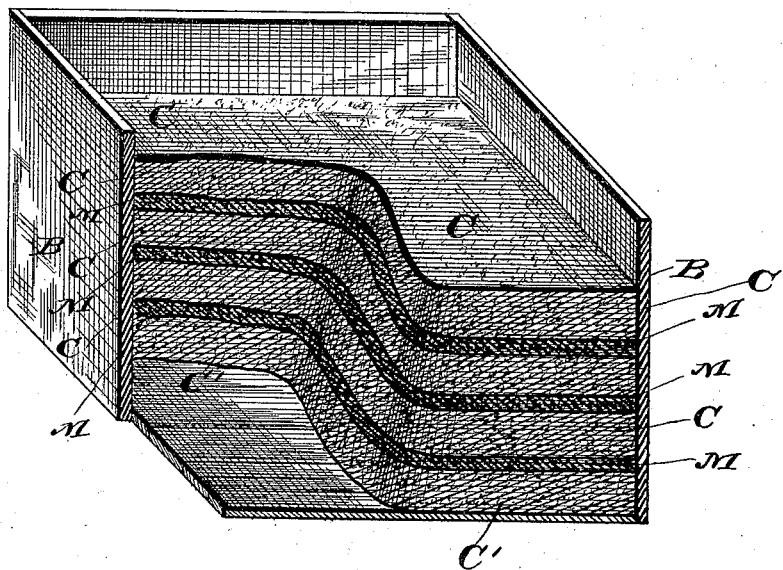
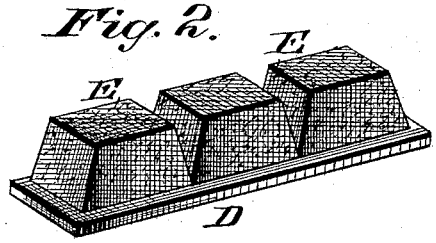

UNITED STATES PATENT OFFICE.

HOMER C. MILLEN AND DEUANE MILLEN, OF SOUTH BEND, INDIANA.

PROCESS OF MANUFACTURING HYDRAULIC CEMENT.

SPECIFICATION forming part of Letters Patent No. 343,913, dated June 15, 1886.

Application filed April 7, 1886. Serial No. 198,074. (No specimens.)

*To all whom it may concern:*

Be it known that we, HOMER C. MILLEN and DEUANE MILLEN, of South Bend, in the county of St. Joseph and State of Indiana, have invented certain new and useful Improvements in Processes of Manufacturing Hydraulic Cement; and we do hereby declare that the following is a full, clear, and exact description thereof, reference being had to the accompanying drawings, and to the letters of reference marked thereon, which form part of this specification, in which—

Figure 1 shows the manner of placing the materials in the principal stage of our process. Fig. 2 is a detail.

The invention is an improved process of making hydraulic cement of marl and clay, its special objects being to accomplish the process in much less time than has hitherto been done, to make a more nearly homogeneous mixture of the materials than by any of the processes now in use, and to manufacture a cheaper and better cement than any one in the market.

To carry the invention into effect, the clay is broken into small-sized pieces and spread in a layer, C', at the bottom of a large box or bin, B. Upon that a layer, M, of freshly-dug marl is spread; then another layer, C, of clay, and another layer, M, of marl, and so on till the bin is filled. The relative thicknesses of the layers of marl and clay are varied according to quality of cement desired to be produced. The clay, on account of its porous character, absorbs the moisture of the marl, so that in a comparatively short time the contents of the bin become nearly or quite homogeneous, the clay having absorbed the surplus moisture of the marl, and thus broken down the clay. The mixture is then cut out of the bin in vertical layers, as shown in Fig. 1, so as to cut through all the original layers of clay and marl, and reduced to a doughy mass by a proper machine that thoroughly works it. The said mass is then formed or cut into blocks E. These blocks are ranged on boards D, Fig. 2, which are loaded on cars or carriages in banks or tiers one above the other, but with no two boards in contact, and run into steam heated or drying kilns. When thoroughly dry, the blocks are placed in a burning-kiln, with alternate layers of coke or coal, and are there burned into clinkers or vitrefied. After being thus burned they are first crushed into small fragments, and then ground by proper means to an impalpable powder.

One of the usual methods of making hydraulic cement is by mixing the materials with water and running the paste thus made into long pits about six feet deep, drawing off the surplus water, and then agitating the mixture continuously to prevent the different materials from separating by gravitation. After evaporation has brought the mass to a proper stiffness it is made into balls, which are burned and dried. The objections to this process are as follows: The mixture, as far from being homogeneous at the first part of the operation, is very crude, and the evaporation takes a comparatively long time—often several months. In our process the time is very much shortened, and the mixture becomes of itself nearly, if not quite, homogeneous.

Another process is to dry the materials separately, pulverize them, mix them in certain proportions with enough water to render the mass plastic, place the said mass in a mixing-machine, from which it issues of the consistency of putty. It is then cut into blocks and dried, burned, and pulverized. This method involves a preliminary drying and grinding or pulverizing, then mixing with water, which has to be evaporated before the blocks are ready for burning.

In our process the material is taken out of the earth with only its natural moisture, arranged in layers, as described, and allowed to "temper," one material affecting the other, as described, till the whole mass becomes homogeneous. Thus we avoid all of the preliminary steps in both the operations and render the process quicker, as the time spent in evaporation is saved; consequently less time and labor are spent, and a cheaper and better cement produced.

Having described our improved process, we claim—

The herein-described process of making hydraulic cement, which process consists in arranging clay and marl, both recently dug from the earth, in alternate layers in a proper receptacle, the clay having been previously broken into small pieces, allowing them to remain in the receptacle till the clay absorbs the surplus moisture of the marl, and thus breaks down the clay, so that the mass becomes homogeneous, removing the mass from the receptacle in vertical slices, and reducing it to a doughy plastic condition, cutting the mass in blocks and drying the same ranged on boards in proper kilns, the boards not touching each other, burning the blocks in a proper kiln, and then grinding or pulverizing them to an impalpable powder.

In testimony that we claim the foregoing as our own we affix our signatures in presence of two witnesses.

HOMER C. MILLEN.
DEUANE MILLEN.

Witnesses:
JAMES DUSHANE,
THOMAS MILLEN.